US009559927B2

(12) United States Patent
Hwang et al.

(10) Patent No.: US 9,559,927 B2
(45) Date of Patent: Jan. 31, 2017

(54) TERMINAL, SYSTEM AND METHOD FOR MEASURING NETWORK STATE USING THE SAME

(71) Applicant: SAMSUNG SDS CO., LTD., Seoul (KR)

(72) Inventors: Jin Bum Hwang, Namyangju-si (KR); Hye Jin Ban, Seoul (KR); Min Woo Song, Seoul (KR); Joong Bae Jeon, Jecheon-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 214 days.

(21) Appl. No.: 14/290,982

(22) Filed: May 30, 2014

(65) Prior Publication Data

US 2014/0355464 A1 Dec. 4, 2014

(30) Foreign Application Priority Data

May 30, 2013 (KR) .................. 10-2013-0062074

(51) Int. Cl.
*H04L 12/26* (2006.01)
*H04L 12/24* (2006.01)
*H04L 29/06* (2006.01)

(52) U.S. Cl.
CPC ......... *H04L 43/0858* (2013.01); *H04L 41/142* (2013.01); *H04L 43/106* (2013.01); *H04L 63/00* (2013.01); *H04L 43/0864* (2013.01)

(58) Field of Classification Search
None
See application file for complete search history.

(56) References Cited

U.S. PATENT DOCUMENTS

| | | | | |
|---|---|---|---|---|
| 5,477,531 A * | 12/1995 | McKee et al. | ................ | 370/249 |
| 5,570,346 A * | 10/1996 | Shur | ............................. | 370/231 |
| 7,133,911 B1 * | 11/2006 | Schaffer et al. | ............. | 709/224 |
| 7,324,530 B2 * | 1/2008 | Jo et al. | ........................ | 370/401 |
| 8,422,367 B2 * | 4/2013 | Chen et al. | .................... | 370/229 |
| 8,446,896 B2 * | 5/2013 | Bedrosian | ..................... | 370/350 |
| 8,499,068 B2 * | 7/2013 | Widera et al. | ................ | 709/224 |
| 8,593,985 B2 * | 11/2013 | Oue et al. | ...................... | 370/252 |
| 8,665,745 B2 * | 3/2014 | Lundin et al. | ................ | 370/252 |
| 8,812,739 B2 * | 8/2014 | Bryant et al. | ................ | 709/248 |
| 2003/0037158 A1 * | 2/2003 | Yano | ....................... | H04L 29/06 709/232 |
| 2003/0072269 A1 * | 4/2003 | Teruhi et al. | ................. | 370/252 |
| 2003/0091029 A1 * | 5/2003 | Jo et al. | ........................ | 370/352 |
| 2006/0059254 A1 * | 3/2006 | Widera et al. | ................ | 709/224 |
| 2006/0168272 A1 * | 7/2006 | Rustad et al. | ............... | 709/230 |
| 2007/0076754 A1 * | 4/2007 | Krishnaswamy | ....... | H04L 45/12 370/468 |
| 2008/0117930 A1 * | 5/2008 | Chakareski | ............. | H04L 47/10 370/465 |

(Continued)

*Primary Examiner* — Steven H Nguyen
(74) *Attorney, Agent, or Firm* — Sughrue Mion, PLLC

(57) ABSTRACT

Provided are a terminal and a system and method of measuring a network state using the terminal. The system of measuring the network state according to an embodiment of the present disclosure includes a transmission terminal that transmits exploration packets, and a reception terminal that receives the exploration packets to measure an One-way Trip Time (OTT) of each of the exploration packets and calculates queuing delay using an average value of the measured OTTs and a minimum value of the measured OTTs.

36 Claims, 8 Drawing Sheets

(56) References Cited

U.S. PATENT DOCUMENTS

| | | | |
|---|---|---|---|
| 2011/0128868 A1* | 6/2011 | Wurm | H04L 43/0852 |
| | | | 370/252 |
| 2011/0134766 A1* | 6/2011 | Zampetti et al. | 370/252 |
| 2011/0153869 A1* | 6/2011 | Bryant et al. | 709/248 |
| 2011/0205889 A1* | 8/2011 | Chen | H04L 47/10 |
| | | | 370/230 |
| 2011/0205895 A1* | 8/2011 | Chen et al. | 370/231 |
| 2011/0216648 A1* | 9/2011 | Mehrotra et al. | 370/230 |
| 2011/0261917 A1* | 10/2011 | Bedrosian | 375/371 |
| 2012/0269204 A1* | 10/2012 | Zampetti | 370/503 |
| 2012/0281572 A1* | 11/2012 | Lundin et al. | 370/252 |
| 2013/0039359 A1* | 2/2013 | Bedrosian | 370/350 |
| 2013/0128735 A1* | 5/2013 | Li | H04L 47/25 |
| | | | 370/230 |

\* cited by examiner

FIG. 5

| FIRST HEADER | SECOND HEADER | DATA | TIMESTAMP | VALID AUTHENTICATION | TRAILER |

FIG. 6A

| 100ms (M+4th OTT) | 74ms (M+3th OTT) | 71ms (M+2th OTT) | 77ms (M+1th OTT) | 82ms (Mth OTT) |

Window(N=3)

FIG. 6B

| 72ms (M+5th OTT) | 100ms (M+4th OTT) | 74ms (M+3th OTT) | 73ms (M+2th OTT) | 77ms (M+1th OTT) |

Window(N=3)

FIG. 7

SOCKET BUFFER

| | t +8 (0) | t +7 (1) | t +6 (2) | t +5 (3) | t +4 (4) | t +3 (5) | t +2 (6) | t +1 (7) | t ms (8) |

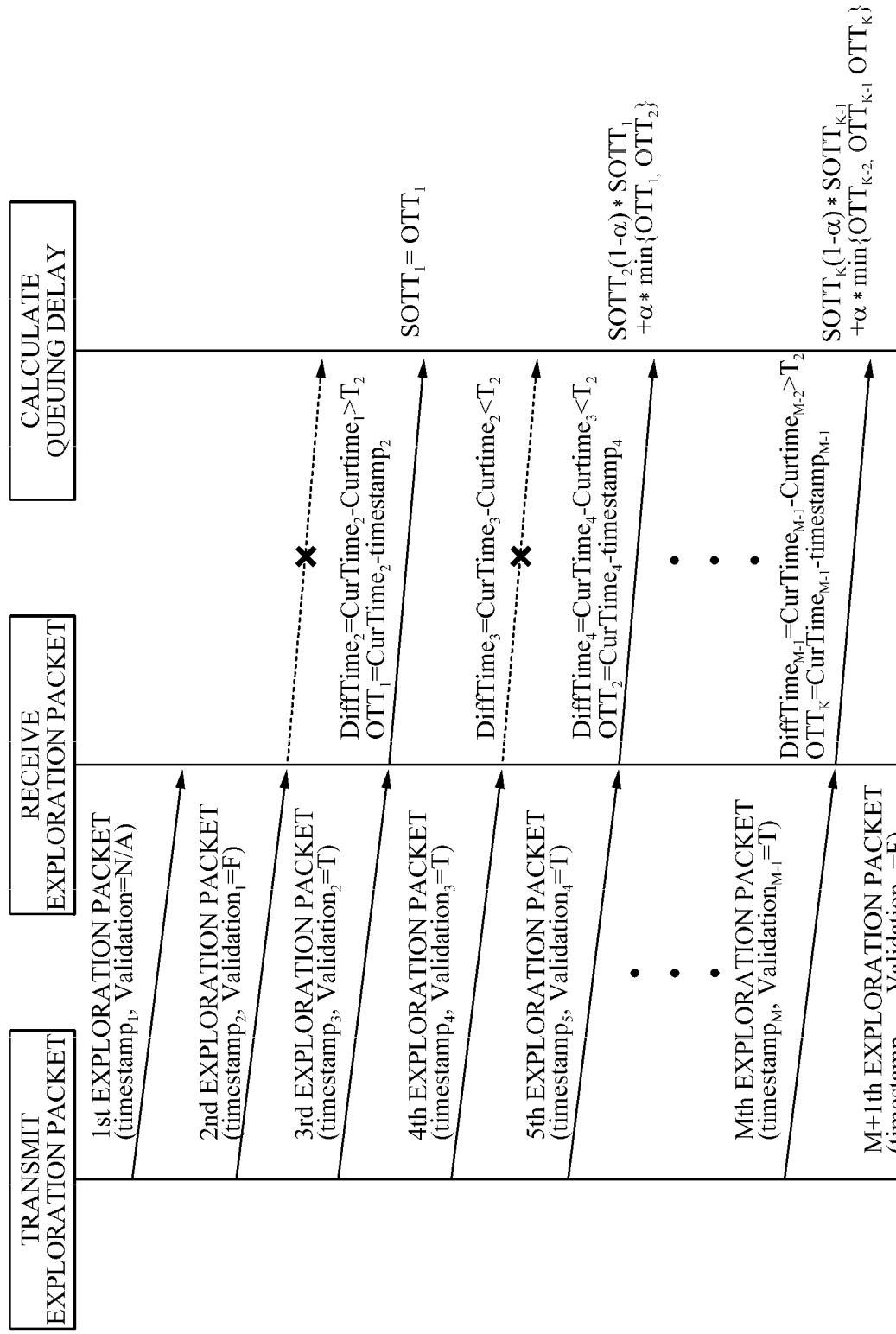

TERMINAL, SYSTEM AND METHOD FOR MEASURING NETWORK STATE USING THE SAME

CROSS-REFERENCE TO RELATED APPLICATION

This application claims priority to and the benefit of Korean Patent Application No. 10-2013-0062074, filed on May 30, 2013, the disclosure of which is incorporated herein by reference in its entirety.

BACKGROUND

1. Field

The present disclosure relates to technologies of measuring a network state, and more particularly, to a terminal for accurately measuring a network state and a system and method of measuring a network state using the same.

2. Discussion of Related Art

A method which is most widely used among methods of measuring a network state may estimate queuing delay and a backlog queue. Here, the queuing delay refers to a time for which a data packet stands by in a queue of a router, and the backlog queue refers to the number of packets standing by in the queue of the router.

In an existing method of estimating the queuing delay and the backlog queue, a TCP-Vegas scheme has been mainly used. This is a method in which, by assuming that a minimum value (RTTmin) among Round Trip Times (RTTs) which are measured from the starting point of packet transmission is an RTT when queuing delay is zero, a value obtained by subtracting the minimum value (RTTmin) from a current RTT (RTTcur) is estimated as current queuing delay. Such a method may be suitable for being applied to a TCP protocol which is operated in an OS kernel, but when RTT is used as it is in an application hierarchical program in which a processing time such as processing switching or the like, other than a wireless network in which a deviation of the RTT is generated in accordance with a network state and queuing delay, or a time for which a packet stands by in a socket buffer is additionally reflected in the RTT, there is a problem that it is difficult to accurately measure the queuing delay. In addition, the backlog queue is calculated by the product of the queuing delay and a current reception rate of a reception terminal, and therefore there is a problem that an error of the queuing delay is transferred as it is to the backlog queue.

Therefore, there is a demand for a method that can accurately measure a network state by minimizing an error occurring when estimating the queuing delay and the backlog queue.

SUMMARY

The present disclosure is directed to a terminal that may minimize an error of queuing delay and a system and method which may measure a network state using the same.

According to an aspect of the present disclosure, there is provided a system of measuring a network state including: a transmission terminal that transmits exploration packets; and a reception terminal that receives the exploration packets to measure an One-way Trip Time (OTT) of each of the exploration packets, and calculates queuing delay using an average value of the measured OTTs and a minimum value of the measured OTTs.

Here, the average value of the OTTs may be calculated by the following Equation 1.

$$SOTT_M = (1-\alpha) \cdot SOTT_{M-1} + \alpha \cdot OTT_M, (0 \leq \alpha \leq 1), \quad \text{[Equation 1]}$$

where $SOTT_M$ denotes an average value of OTTs up to an M-th exploration packet, $SOTT_{M-1}$ denotes an average value of OTTs up to an (M−1)-th exploration packet, $OTT_M$ denotes an one way trip time of an M-th exploration packet, and α denotes a weighted value indicating a ratio in which an OTT value of the M-th exploration packet is reflected in the average value of OTTs.

Also, the exploration packet may include a validity authentication field, and the transmission terminal may compare a difference between a current time of the point of transmission of the exploration packet to a transmission socket and a timestamp value of the exploration packet with a predetermined first reference time ($T_1$) to thereby set a validity authentication value, and record the set validity authentication value in a validity authentication field of a next exploration packet.

Also, the transmission terminal may set the validity authentication value as false when the difference between the current time of the point of transmission of the exploration packet to the transmission socket and the timestamp value of the exploration packet exceeds the predetermined first reference time ($T_1$), and set the validity authentication value as true when the difference between the current time of the point of transmission of the exploration packet to the transmission socket and the timestamp value of the exploration packet is the predetermined first reference time ($T_1$) or less.

Also, the reception terminal may determine whether a timestamp value of an exploration packet received prior to the exploration packet is valid in accordance with the validity authentication value recorded in the validity authentication field of the received exploration packet, and measure the OTT using the timestamp value determined to be valid.

Also, the first reference time ($T_1$) may be set based on at least one of a process scheduling time of the transmission terminal, an average time required for garbage collection, and an allowable maximum error time.

Also, the reception terminal may compare a difference between a reception time of a previous exploration packet and a reception time of a current exploration packet with a predetermined second reference time ($T_2$) to thereby determine whether to measure the OTT of the current exploration packet.

Also, the reception terminal may measure the OTT using the timestamp value of the current exploration packet when the difference between the reception time of the previous exploration packet and the reception time of the current exploration packet is the second reference time ($T_2$) or more, and discard the timestamp value of the current exploration packet when the difference between the reception time of the previous exploration packet and the reception time of the current exploration packet is less than the second reference time ($T_2$).

Also, the second reference time ($T_2$) may be set to be a predetermined ratio $W_1$ ($W_1<1$) based on a transmission interval of the previous exploration packet and the current exploration packet.

Also, the second reference time ($T_2$) may be set to be a predetermined ratio $W_2$ ($W_2>1$) based on a minimum value of the differences each between the reception time of the previous exploration packet and the reception time of the current exploration packet.

Also, the reception terminal may use a minimum value of OTT values included in a window with a predetermined size in order to obtain the average value of the OTTs.

According to another aspect of the present disclosure, there is provided a terminal including: a data transmission unit that transmits a data packet to an external terminal; an exploration packet transmission unit that transmits an exploration packet in which a validity authentication field is added, to the external terminal; and a transfer rate control unit that controls a data packet transfer rate of the data transmission unit in accordance with a network state measurement variable received from the external terminal, wherein the exploration packet transmission unit compares a difference between a current time of the point of transmission of the exploration packet to a transmission socket and a timestamp value of the exploration packet with a predetermined first reference time ($T_1$) to thereby set a validity authentication value, and records the set validity authentication value in a validity authentication field of a next exploration packet.

Here, the exploration packet transmission unit may set the validity authentication value as false when the difference between the current time of the point of transmission of the exploration packet to the transmission socket and the timestamp value of the exploration packet exceeds the predetermined first reference time ($T_1$), and set the validity authentication value as true when the difference between the current time of the point of transmission of the exploration packet to the transmission socket and the timestamp value of the exploration packet is the predetermined first reference time ($T_1$) or less.

Also, the first reference time ($T_1$) may be set based on at least one of a process scheduling time of the terminal, an average time required for garbage collection, and an allowable maximum error time.

According to still another aspect of the present disclosure, there is provided a terminal including: an exploration packet reception unit that receives exploration packets, and measures an OTT using the received exploration packets; and a queuing delay calculation unit that obtains an average value of the OTTs transmitted from the exploration packet reception unit, and calculates queuing delay using the average value of the OTTs and a minimum value of the OTTs transmitted from the exploration packet reception unit.

Here, the queuing delay calculation unit may calculate the average value of the OTTs by the following Equation 2.

$$SOTT_M = (1-\alpha) \cdot SOTT_{M-1} + \alpha \cdot OTT_M, (0 \leq \alpha \leq 1),\quad\text{[Equation 2]}$$

where $SOTT_M$ denotes an average value of OTTs up to an M-th exploration packet, $SOTT_{M-1}$ denotes an average value of OTTs up to an (M−1)-th exploration packet, and $\alpha$ denotes a weighted value indicating a ratio in which an OTT value of the M-th exploration packet is reflected in the average value of OTTs.

Also, the exploration packet reception unit may determine whether a timestamp value of an exploration packet received prior to the exploration packet is valid in accordance with the validity authentication value recorded in the validity authentication field of the received exploration packet, and measure the OTT using the timestamp value determined to be valid.

Also, the exploration packet reception unit may compare a difference between a reception time of a previous exploration packet and a reception time of a current exploration packet with a predetermined second reference time ($T_2$) to thereby determine whether to measure the OTT of the current exploration packet.

Also, the exploration packet reception unit may measure the OTT using the timestamp value of the current exploration packet when the difference between the reception time of the previous exploration packet and the reception time of the current exploration packet is the second reference time ($T_2$) or more, and discard the timestamp value of the current exploration packet when the difference between the reception time of the previous exploration packet and the reception time of the current exploration packet is less than the second reference time ($T_2$).

Also, the second reference time ($T_2$) may be set to be a predetermined ratio $W_1$ ($W_1<1$) based on a transmission interval of the previous exploration packet and the current exploration packet.

Also, the second reference time ($T_2$) may be set to be a predetermined ratio $W_2$ ($W_2>1$) based on a minimum value of the differences each between the reception time of the previous exploration packet and the reception time of the current exploration packet.

Also, the queuing delay calculation unit may use a minimum value of OTT values included in a window with a predetermined size in order to obtain the average value of the OTTs.

According to yet another aspect of the present disclosure, there is provided a terminal including: an exploration packet reception unit that receives exploration packets, and measures an OTT using the received exploration packets; and a queuing delay calculation unit that calculates queuing delay using the OTT, wherein the exploration packet reception unit determines whether a timestamp value of an exploration packet received prior to the exploration packet is valid in accordance with a validity authentication value recorded in a validity authentication field of the received exploration packet, and measures the OTT using the timestamp value determined to be valid.

According to further aspect of the present disclosure, there is provided a terminal including: an exploration packet reception unit that receives exploration packets, and measures an OTT using the received exploration packets; and a queuing delay calculation unit that calculates queuing delay using the OTT, wherein the exploration packet reception unit compares a difference between a reception time of a previous exploration packet and a reception time of a current exploration packet with a predetermined second reference time ($T_2$) to thereby determine whether to measure an OTT of the current exploration packet.

Here, the exploration packet reception unit may measure the OTT using the timestamp value of the current exploration packet when the difference between the reception time of the previous exploration packet and the reception time of the current exploration packet is the second reference time ($T_2$) or more, and discard the timestamp value of the current exploration packet when the difference between the reception time of the previous exploration packet and the reception time of the current exploration packet is less than the second reference time ($T_2$).

Also, the second reference time ($T_2$) may be set to be a predetermined ratio $W_1$ ($W_1<1$) based on a transmission interval of the previous exploration packet and the current exploration packet.

Also, the second reference time ($T_2$) may be set to be a predetermined ratio $W_2$ ($W_2>1$) based on a minimum value of the differences each between the reception time of the previous exploration packet and the reception time of the current exploration packet.

According to further aspect of the present disclosure, there is provided a method of measuring a network state, including: transmitting, by a transmission terminal, exploration packets; receiving, by a reception terminal, the exploration packets to measure an OTT; and obtaining, by the reception terminal, an average value of the OTTs and calculating queuing delay using the average value of the OTTs and a minimum value of the OTTs.

Here, the obtaining of the average value of the OTTs may include calculating the average value of the OTTs by the following Equation 3.

$$SOTT_M = (1-\alpha) \cdot SOTT_{M-1} + \alpha \cdot OTT_M, (0 \leq \alpha \leq 1),$$ [Equation 3]

where $SOTT_M$ denotes an average value of OTTs up to an M-th exploration packet, $SOTT_{M-1}$ denotes an average value of OTTs up to an (M−1)-th exploration packet, $OTT_M$ denotes an one way trip time of an M-th exploration packet, and a denotes a weighted value indicating a ratio in which an OTT value of the M-th exploration packet is reflected in the average value of OTTs.

Also, the transmitting of the exploration packets may include adding, by the transmission terminal, a validity authentication field to the exploration packet, comparing, by the transmission terminal, a difference between a current time of the point of transmission of the exploration packet to a transmission socket and a timestamp value of the exploration packet with a predetermined first reference time ($T_1$), and setting, by the transmission terminal, a validity authentication value in accordance with a result of the comparing, and recording the set validity authentication value in a validity authentication field of a next exploration packet.

Also, the receiving of the exploration packets to measure the OTT may include determining, by the reception terminal, whether a timestamp value of an exploration packet received prior to the exploration packet is valid in accordance with the validity authentication value recorded in the validity authentication field of the exploration packet, and measuring, by the reception terminal, the OTT using the timestamp value determined to be valid.

Also, the first reference time ($T_1$) may be set based on at least one of a process scheduling time of the transmission terminal, an average time required for garbage collection, and an allowable maximum error time.

Also, the receiving of the exploration packets to measure the OTT may include comparing, by the reception terminal, a difference between a reception time of a previous exploration packet and a reception time of a current exploration packet with a predetermined second reference time ($T_2$) to thereby determine whether to measure the OTT of the current exploration packet.

Also, the comparing of the difference with the second reference time ($T_2$) to thereby determine whether to measure the OTT may include verifying, by the reception terminal, whether the difference between the reception time of the previous exploration packet and the reception time of the current exploration packet is the second reference time ($T_2$) or more, and measuring, by the reception terminal, the OTT using the timestamp value of the current exploration packet when the difference between the reception time of the previous exploration packet and the reception time of the current exploration packet is the second reference time ($T_2$) or more.

Also, the comparing of the difference with the second reference time ($T_2$) to thereby determine whether to measure the OTT may include discarding, by the reception terminal, the timestamp value of the current exploration packet when the difference between the reception time of the previous exploration packet and the reception time of the current exploration packet is less than the second reference time ($T_2$).

Also, the second reference time ($T_2$) may be set to be a predetermined ratio $W_1$ ($W_1$<1) based on a transmission interval of the previous exploration packet and the current exploration packet.

Also, the second reference time ($T_2$) may be set to be a predetermined ratio $W_2$ ($W_2$>1) based on a minimum value of the differences each between the reception time of the previous exploration packet and the reception time of the current exploration packet.

Also, the comparing of the difference with the second reference time ($T_2$) to thereby determine whether to measure the OTT may include consecutively transmitting, by the transmission terminal, a plurality of exploration packets, receiving, by the reception terminal, the plurality of exploration packets and obtaining each difference between the reception time of the previous exploration packet and the reception time of the current exploration packet, and obtaining, by the reception terminal, a minimum value of the differences each between the reception time of the previous exploration packet and the reception time of the current exploration packet, and setting the second reference time ($T_2$) to be a predetermined ratio $W_2$ ($W_2$>1) based on the minimum value of the differences each between the reception time of the previous exploration packet and the reception time of the current exploration packet.

Also, the obtaining of the average value of the OTTs may include extracting, by the reception terminal, a minimum value from OTTs included in a window with a predetermined size, and using, by the reception terminal, the extracted minimum value of the OTTs in order to obtain the average value of the OTTs.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which:

FIG. 5 illustrates a configuration of an exploration packet according to another embodiment of the present disclosure;

FIGS. 6A and 6B illustrate a state in which a queuing delay calculation unit according to an embodiment of the present disclosure extracts a minimum value from one-way trip time (OTT) values using a window with a size of 3;

FIG. 7 illustrates a state in which exploration packets stand by in a socket buffer of a reception terminal according to an embodiment of the present disclosure;

FIG. 11 illustrates a flow over time of preventing errors caused by first to third error cases in a method of measuring a network state according to an embodiment of the present disclosure.

DETAILED DESCRIPTION OF EXEMPLARY EMBODIMENTS

Figure 1:
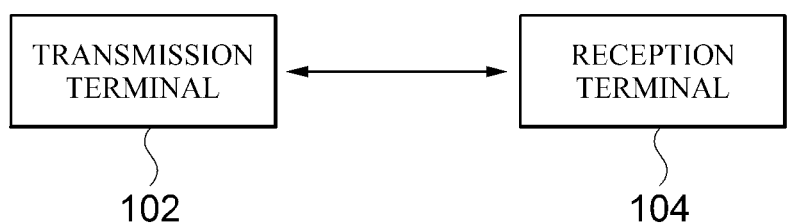
FIG. 1 illustrates a system of measuring a network state according to an embodiment of the present disclosure.

Hereinafter, a terminal according to an embodiment of the present disclosure and a system and method of measuring a network state using the terminal will be described in detail with reference to FIGS. 1 to 11. However, the present disclosure is not limited to the exemplary embodiments disclosed below, but can be implemented in various forms. The following exemplary embodiments are described in order to enable those of ordinary skill in the art to embody and utilize the present disclosure.

When it is determined that the detailed description of known art related to the present disclosure may obscure the gist of the present disclosure, the detailed description thereof will be omitted. The same reference numerals are used to refer to the same elements throughout the specification. Terminology described below is defined considering functions in the present disclosure and may vary according to a user's or operator's intention or usual practice. Thus, the meanings of the terminology should be interpreted based on the overall context of the present specification.

Consequently, the technical spirit of the present disclosure is deters pined by the claims, and the following embodiments are only means to efficiently explain progressive technical features of the present disclosure to those skilled in the art to which the present disclosure pertains.

FIG. 1 illustrates a system of measuring a network state according to an embodiment of the present disclosure.

Referring to 1, a system 100 of measuring the network state includes a transmission terminal 102 and a reception terminal 104.

The transmission terminal 102 transmits exploration packets to the reception terminal 104. In this instance, the transmission terminal 102 may periodically transmit the exploration packets to the reception terminal 104. Hereinafter, a configuration of the exploration packets transmitted by the transmission terminal 102 will be described with reference to FIG. 2.

Figure 2:
FIG. 2 illustrates a configuration of an exploration packet according to an embodiment of the present disclosure.

FIG. 2 illustrates a configuration of an exploration packet according to an embodiment of the present disclosure. Referring to FIG. 2, the exploration packet may include fields such as a first header, a second header, data, a timestamp, and a trailer. The first header is a network protocol header and includes header information required for layers from a transport layer of a network protocol stack to a physical layer thereof. The second header is a header of application hierarchy, and includes information required for combining packets which are separated and transmitted by the transmission terminal 102 and then received by the reception terminal 104. The second header may include information such as a serial number, a data amount, and the like of each packet. Here, the first header and the second header may be formed as a single header. The data field includes data actually transmitted. The timestamp field includes time information of the point of transmission of the corresponding packet. The trailer field includes a trailer of the network protocol stack, but the present disclosure is not limited thereto. For example, the trailer field may include a trailer of application hierarchy.

The transmission terminal 102 may separately generate an exploration packet and transmit the generated exploration packet to the reception terminal 104, but the present disclosure is not limited thereto. For example, a data packet itself generated in a corresponding service may be used as the exploration packet. In this instance, the whole data packet may be used as the exploration packet, but the present disclosure is not limited thereto. For example, a part of the data packet may be used as the exploration packet.

The reception terminal 104 receives the exploration packet transmitted by the transmission terminal 102 to measure an One-way Trip Time (OTT), and then calculates a network state measurement variable (for example, queuing delay, backlog queue, transfer rate, and the like) using the measured OTT. The reception terminal 104 may transmit the calculated network state measurement variable to the transmission terminal 102. In this case, the transmission terminal 102 controls a transfer rate of the data packet using the network state measurement variable.

When the transmission terminal 102 controls the transfer rate of the data packet, only forward queuing delay (that is, queuing delay when the packet is transmitted from the transmission terminal 102 to the reception terminal 104) should be considered, and therefore the reception terminal 104 measures the OTT using the exploration packet received from the transmission terminal 102. In a case of a Round Trip Time (RTT), reverse queuing delay (that is, queuing delay when the packet is transmitted from the reception terminal 104 to the transmission terminal 102) is also included, and therefore more accurate forward queuing delay may be obtained using the OTT rather than the RTT.

Specifically, when receiving the exploration packet from the transmission terminal 102, the reception terminal 104 estimates a value obtained by subtracting the timestamp of the exploration packet from a reception time of the exploration packet, as an OTT (OTTnew) of the exploration packet which is currently received. The reception terminal 104 may compare the OTT (OTTnew) of the currently received exploration packet and a minimum value (OTTmin) among OTTs which have been measured so far from the point of reception of the exploration packet from the transmission terminal 102 to thereby update the minimum value (OTTmin) of the OTTs. In his instance, the minimum value (OTTmin) of the OTTs may be considered as a value when the queuing delay is zero.

The reception terminal 104 may obtain queuing delay (QD) of the currently received exploration packet by the following Equation 1.

$$QD = OTTnew - OTTmin \qquad [\text{Equation 1}]$$

That is, the reception terminal 104 may use a value obtained by subtracting the minimum value (OTTmin) of the OTTs from the OTT (OTTnew) of the currently received exploration packet, as the queuing delay of the currently received exploration packet.

However, an error is highly likely to occur when the queuing delay is obtained in units of one exploration packet, and therefore the reception terminal 104 may use an average value (SOTT) of the OTTs rather than the OTT (OTTnew) of the currently received exploration packet. In this case, queuing delay ($QD_M$) of an M-th exploration packet which is currently received may be obtained by the following Equation 2.

$$QD_M = SOTT_M - OTTmin \quad \text{[Equation 2]}$$

Here, $SOTT_M$ denotes an average value of OTTs which have been measured from the point of reception of the exploration packet to the point of the current M-th exploration packet. The $SOTT_M$ may be represented as the following Equation 3.

$$SOTT_M = (1-\alpha) \cdot SOTT_{M-1} + \alpha \cdot OTT_M \ (0 \leq \alpha \leq 1) \quad \text{[Equation 3]}$$

Here, $OTT_M$ denotes an one way trip time of an M-th exploration packet, and α denotes a weighted value indicating a ratio in which an OTT value of the M-th exploration packet is reflected in the average value of OTTs.

Figure 3:
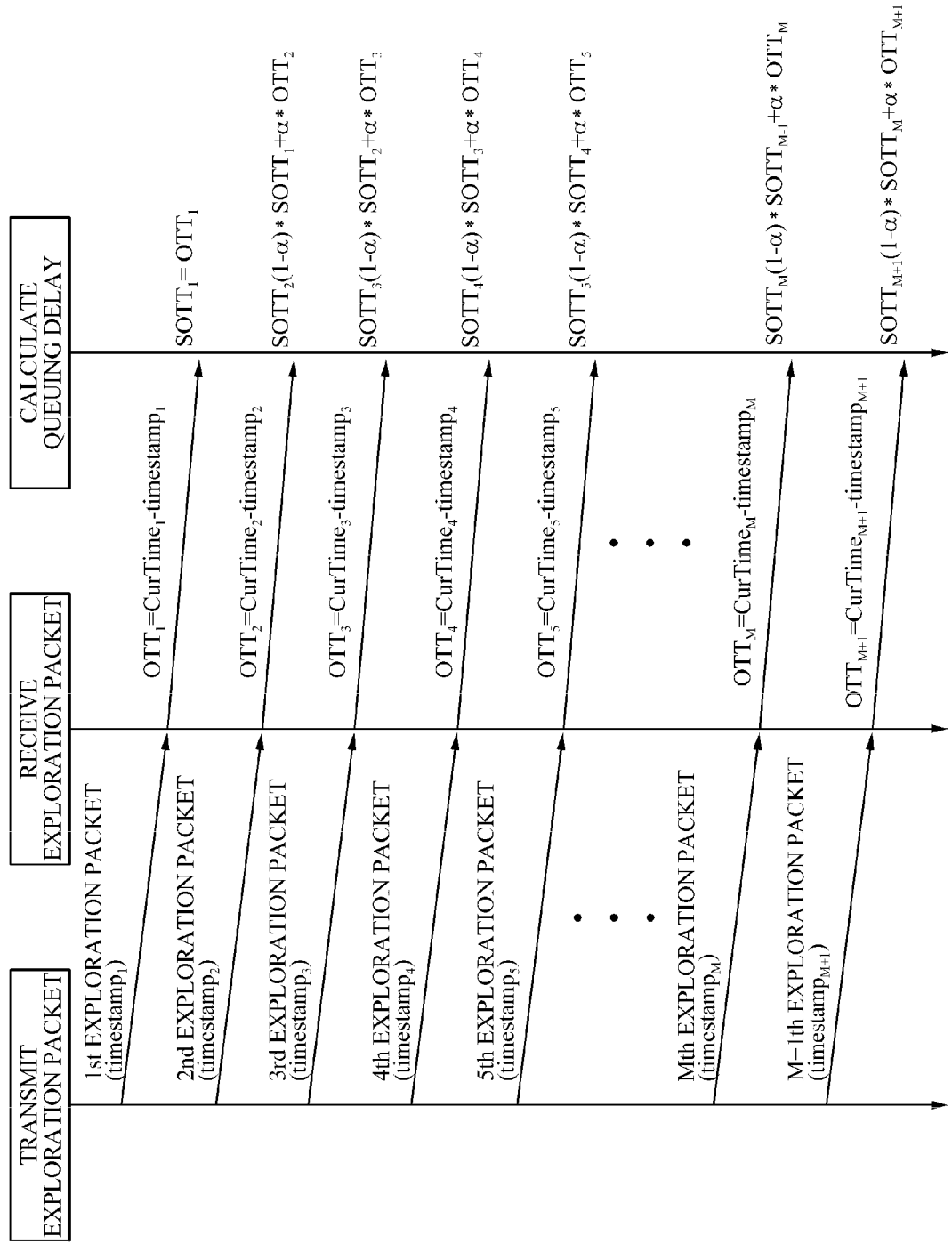
FIG. 3 illustrates a process of calculating queuing delay in a system of measuring a network state according to an embodiment of the present disclosure.

FIG. 3 illustrates a process of calculating queuing delay in a system of measuring a network state according to an embodiment of the present disclosure.

Referring to FIG. 3, when the transmission terminal 102 periodically transmits the exploration packet, the reception terminal 104 receives the exploration packet to calculate queuing delay. When transmitting the exploration packet, the transmission terminal 102 records a timestamp in the exploration packet to transmit. When receiving the M-th exploration packet, the reception terminal 104 obtains the OTT of the M-th exploration packet ($OTT_M$) using the value obtained by subtracting a timestamp ($Timestamp_M$) of the corresponding exploration packet from a current time ($CurTime_M$) when the exploration packet is received. Next, the reception terminal 104 obtains the minimum value (OTTmin) of the OTTs up to the M-th exploration packet, obtains the average value ($SOTT_M$) of the OTTs up to the M-th exploration packet using Equation 3, and obtains queuing delay of the M-th exploration packet using Equation 2. Here, there is no existing OTT value in a case of the first exploration packet, and thus $OTT_1 = SOTT_1$ is set and then the average value ($SOTT_M$) of the OTTs up to the M-th exploration packet starting from the second exploration packet using Equation 3.

Meanwhile, in a process in which the transmission terminal 102 transmits the exploration packet and the reception terminal 104 receives the exploration packet to calculate a network state measurement variable, an error may occur in the network state measurement variable calculated by the reception terminal 104. That is, when process switching to another process is performed by an Operation System (OS) while a network state measurement operation is performed by the transmission terminal 102 and the reception terminal 104 or an operation such as garbage collection is non-periodically performed, a predetermined waiting time is generated and such a waiting time is reflected in the OTT value, and therefore an error may occur in the network state measurement variable. Hereinafter, a case in which an error occurs in the network state measurement variable will be described in detail.

1) When another operation such as process switching or garbage collection is performed before the transmission terminal 102 transmits the exploration packet with the recorded timestamp to the reception terminal 104 after recording the timestamp in the exploration packet, the exploration packet is transmitted after several to several tens of msec from the timestamp recorded in the exploration packet, and therefore an error may occur in the OTT measured by the reception terminal 104 (hereinafter, referred to as "first error case").

2) An error may occur in the OTT due to a time for which the exploration packet stands by in a socket buffer of the reception terminal 104. That is, when the reception terminal 104 receives the exploration packet but the exploration packet stands by in the socket buffer without immediately calculating the OTT because another operation is momentarily performed or other exploration packets are piled up at the socket buffer, an error may occur in the OTT measured by the reception terminal 104 (hereinafter, referred to as "second error case").

For example, when the reception terminal 104 receives the exploration packet but the corresponding operation is interrupted for 20 ms due to occurrence of garbage collection, all of the exploration packets received for the corresponding time are piled up and stand by in the socket buffer of the reception terminal 104. In this case, when the OTT is measured by the reception terminal 104, an error may occur in the OTT because the standing-by time in the socket buffer is included.

3) When another operation is performed between a time of reading the exploration packet in the socket buffer of the reception terminal 104 and a time of measuring the current time, an error may occur in the OTT measured by the reception terminal 104 (hereinafter, referred to as "third error case").

Hereinafter, a method of reducing such an error in the system 100 of measuring the network state according to an embodiment of the present disclosure will be described.

Figure 4:
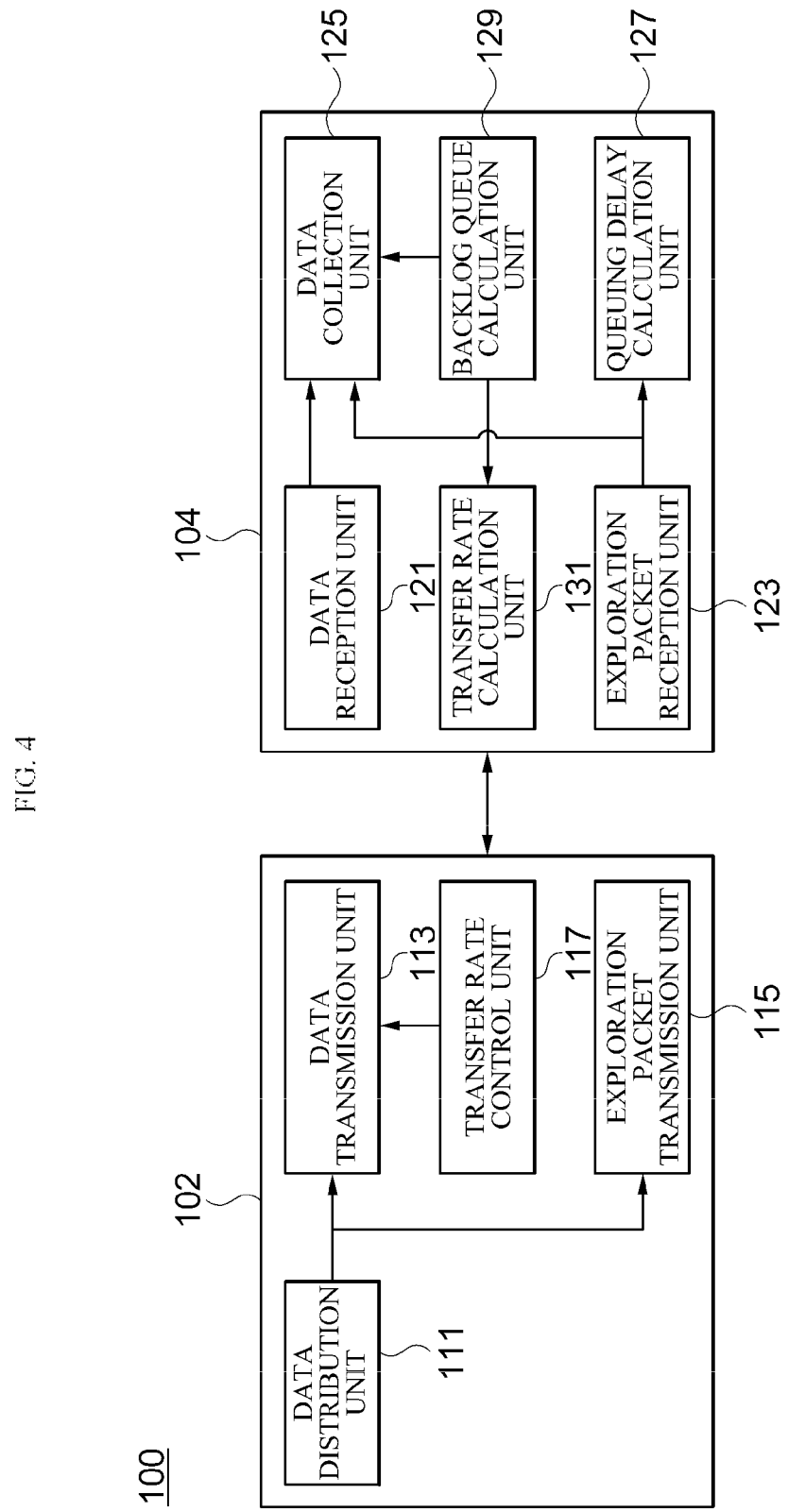
FIG. 4 illustrates a configuration of a transmission terminal and a reception terminal according to an embodiment of the present disclosure.

FIG. 4 illustrates a configuration of a transmission terminal and a reception terminal according to an embodiment of the present disclosure.

Referring to FIG. 4, the transmission terminal 102 includes a data distribution unit 111, a data transmission unit 113, an exploration packet transmission unit 115, and a transfer rate control unit 117.

The data distribution unit 111 serves to separate data to be transmitted to the reception terminal 104, in units of packet. Here, the whole or a part of the data packet may be used as the exploration packet. In this case, the data distribution unit 111 may distribute the separated packet to the data transmission unit 113 and the exploration packet transmission unit 115, respectively. For example, when it is assumed that the total number of packets is $N_T$ and the number of exploration packets among these packets is $N_P (\leq N_T)$, a ratio of the exploration packets is $R_T = N_P/N_T$. In this case, one exploration packet is transmitted per $1/R_T$ of the total number of exploration packets.

When the exploration packet transmission unit 115 periodically transmits the exploration packets at equal intervals, the data distribution unit 111 repeatedly performs a process of transmitting one exploration packet to the exploration packet transmission unit 115 and transmitting the ($1/R_T - 1$) number of exploration packets to the data transmission unit 113. Here, a case in which the data packet is used as the exploration packet has been described, but the present disclosure is not limited thereto. For example, the exploration packet may be separately generated.

The data transmission unit 113 serves to transmit the data packet transmitted from the data distribution unit 111, to the reception terminal 104. The data transmission unit 113 may add header information to the data packet transmitted from the data distribution unit 111 to thereby transmit the data packet with the added information to the reception terminal 104.

The exploration packet transmission unit 115 may use the packet transmitted from the data distribution unit 111 as the exploration packet to thereby transmit the exploration packet to the reception terminal 104. The exploration packet transmission unit 115 may add a header to the packet transmitted from the data distribution unit 111, record a current time in the timestamp of the packet, and transmit the packet to the reception terminal 104. However, the present disclosure is not limited thereto, and the exploration packet transmission unit 115 may generate a separate exploration packet to transmit the generated exploration packet to the reception terminal 104.

Meanwhile, a validity authentication field for preventing an error caused by the first error case may be further included in the exploration packet transmitted by the exploration packet transmission unit 115. That is, as shown in FIG. 5, a validity authentication field may be added to the exploration packet. Here, the validity authentication field is used to indicate validity of the timestamp value of the exploration packet which has been transmitted immediately prior to the corresponding exploration packet. For example, the exploration packet transmission unit 115 adds a header to the packet transmitted from the data distribution unit 111, records the timestamp in the packet to transmit the packet with the recorded timestamp to a transmission socket, and then immediately obtains a current time.

Next, the exploration packet transmission unit 115 obtains a difference between the current time and the timestamp value of the corresponding exploration packet. In this instance, when the difference between the current time and the timestamp value of the corresponding exploration packet exceeds a predetermined first reference time ($T_1$), it is determined that another operation is intervened between the point in time when the timestamp is recorded in the corresponding exploration packet and the point in time when the corresponding exploration packet is transmitted to the transmission socket, so that a validity authentication value is set as false. In addition, when the difference between the current time and the timestamp value of the corresponding exploration packet is the predetermined first reference time ($T_1$) or less, it is determined that no other operation is intervened between the point in time when the timestamp is recorded in the corresponding exploration packet and the point in time when the corresponding exploration packet is transmitted to the transmission socket, so that the validity authentication value is set as true. Here, the validity authentication value is recorded in the validity authentication field of the next exploration packet when the next exploration packet is transmitted. That is, whether the timestamp value of the current exploration packet is valid is recorded in the validity authentication field of the next exploration packet to be transmitted. Here, the first reference time ($T_1$) may be calculated based on at least one of a process scheduling time of an Operation System (OS), an average time required for garbage collection, and an allowable maximum error time.

The exploration packet transmission unit 115 may consecutively transmit a plurality of exploration packets when the network state is initially measured in order to prevent an error caused by the second error case. In this instance, the plurality of exploration packets transmitted when the network state is initially measured may be used as test packets. This will be described in more detail later.

The transfer rate control unit 117 may control a transfer rate of the data packet which is transmitted from the data transmission unit 113 in accordance with a network state measurement variable transmitted from the reception terminal 104. Here, the network state measurement variable may be at least one of queuing delay, a data reception rate, a backlog queue, and a transfer rate. For example, when receiving the queuing delay and the data reception rate from the reception terminal 104, the transfer rate control unit 117 may calculate the backlog queue using the queuing delay and the data reception rate, and calculate the transfer rate using the calculated backlog queue. In this instance, the transfer rate of the data packet transmitted from the data transmission unit 113 may be controlled in accordance with the calculated transfer rate. In addition, when the transfer rate is transmitted from the reception terminal 104, the transfer rate control unit 117 controls the transfer rate of the data packet transmitted from the data transmission unit 113 in accordance with the transmitted transfer rate. In this case, by adjusting the transfer rate of the data packet in accordance with the network state, data transmission efficiency may be improved.

Here, the data transmission unit 113 and the exploration packet transmission unit 115 have been described as separate configurations, but the present disclosure is not limited thereto. For example, the data transmission unit 113 and the exploration packet transmission unit 115 may be implemented as a single configuration.

Referring again to FIG. 4, the reception terminal 104 includes a data reception unit 121, an exploration packet reception unit 123, a data collection unit 125, a queuing delay calculation unit 127, a backlog queue calculation unit 129, and a transfer rate calculation unit 131.

The data reception unit 121 receives a data packet transmitted by the data transmission unit 113, and transmits the received data packet to the data collection unit 125.

The exploration packet reception unit 123 receives an exploration packet transmitted by the exploration packet transmission unit 115, and obtains and transmits an OTT of the received exploration packet to the queuing delay calculation unit 127. In addition, the exploration packet reception unit 123 may transmit the received exploration packet to the data collection unit 125.

Specifically, when receiving the exploration packet, the exploration packet reception unit 123 obtains a current time when each of the exploration packets is received, and verifies a validity authentication field of the received exploration packet to thereby determine whether the exploration packet received prior to the corresponding exploration packet is valid. For example, when a validity authentication field value of the currently received exploration packet is true, the exploration packet reception unit 123 determines that a timestamp (PreTimestamp) value of the exploration packet received prior to the currently received exploration packet is valid. In this instance, the exploration packet reception unit 123 obtains an OTT of the previously received exploration packet by subtracting the timestamp (PreTimestamp) value of the previously received exploration packet from a reception time (PreTime) of the previously received exploration packet, and transmits the obtained OTT to the queuing delay calculation unit 127. When the validity authentication field value of the currently received exploration packet is false, the exploration packet reception unit 123 determines that the timestamp (PreTimestamp) value of the exploration packet received prior to the currently received exploration packet is not valid. In this instance, the exploration packet reception unit 123 does not use the previously received exploration packet as a sample of obtaining the OTT. The exploration packet reception unit 123 may discard the timestamp value which is not valid. In this manner, only when the timestamp value of the exploration packet is valid, the OTT of the corresponding exploration packet may be obtained to be transmitted to the queuing delay calculation unit 127, and therefore it is possible to prevent an error caused by the first error case.

Meanwhile, the exploration packet reception unit 123 may perform the following process in order to prevent an error caused by the second error case (that is, error occurring when the exploration packet stands by in the socket buffer of the reception terminal 104).

The exploration packet reception unit 123 obtains a difference between a time of reading the previous exploration packet and a time of reading the current exploration packet in the socket buffer of the reception terminal 104. In this instance, the time for which the exploration packet reception unit 123 reads the exploration packet in the socket buffer corresponds to the reception time of the corresponding exploration packet. That is, according to the present disclosure, the time of reading the exploration packet may be used as the same meaning as the reception time of the exploration packet. Here, when a difference between the time of reading the previous exploration packet and the time of reading the current exploration packet is less than a predetermined second reference time ($T_2$), the exploration packet reception unit 123 determines that the current exploration packet stands by in the socket buffer of the reception terminal 104, and therefore the current exploration packet is not used as a sample of obtaining the OTT.

In this instance, the second reference time ($T_2$) may be set to be a predetermined ratio $W_1$ ($W_1<1$) based on transmission intervals between the exploration packets. That is, the second reference time ($T_2$) may be represented as the following Equation 4.

$$T_2 = \text{DiffSendTime}_{N,N-1} \times W_1 \quad \text{[Equation 4]}$$

Here, $\text{DiffSendTime}_{N,N-1}$ denotes a difference between a transmission time of an N-th exploration packet and a transmission time of an (N−1)-th exploration packet.

In general, since a time of processing the exploration packets in the reception terminal 104 is shorter than the transmission interval between the exploration packets, the fact that the difference (that is, processing interval between exploration packets) between the time of reading the previous exploration packet and the time of reading the current exploration packet in the socket buffer of the reception terminal 104 is the second reference time ($T_2$) or more means that the current exploration packet is highly likely to have been immediately processed without the standing-by time in the socket buffer of the reception terminal 104. Thus, the exploration packet reception unit 123 uses the current exploration packet as the sample of obtaining the OTT, and transmits the OTT of the current exploration packet to the queuing delay calculation unit 127. However, when the difference between the time of reading the previous exploration packet and the time of reading the current exploration packet in the socket buffer of the reception terminal 104 is less than the second reference time ($T_2$), the current exploration packet is highly likely to have stood by in the socket buffer of the reception terminal 104 for a predetermined time and then to have been processed. Thus, the exploration packet reception unit 123 does not use the current exploration packet as the sample of obtaining the OTT.

Here, a case in which the second reference time ($T_2$) (hereinafter, the second reference time ($T_2$) by a first method) is set to be the predetermined ratio $W_1$ ($W_1<1$) based on the transmission intervals between the exploration packets has been described, but the present disclosure is not limited thereto. That is, the second reference time ($T_2$) may be set by a different method. For example, a plurality of exploration packets may stand by in the socket buffer of the reception terminal 104, difference values (DiffTime) (that is, processing interval between the exploration packets) between the time for which the exploration packet reception unit 123 reads the previous exploration packet in the socket buffer and the time for which the exploration packet reception unit 123 reads the current exploration packet may be obtained, and then a value obtained by multiplying the minimum value ($\text{DiffTime}_{MIN}$) of the difference values (DiffTime) by a predetermined ratio $W_2$ ($W_2>1$) may be set as the second reference value ($T_2$). Hereinafter, this is referred to as the second reference time ($T_2$) by a second method.

A process of setting the second reference time ($T_2$) by the second method will be described again as follows.

In order to set the second reference time ($T_2$) by the second method, the exploration packet transmission unit 115 may consecutively transmit a plurality of exploration packets to the reception terminal 104 when initially measuring the network state. Then, the exploration packets are piled up in the socket buffer of the reception terminal 104. In this instance, the exploration packet reception unit 123 may obtain the minimum value ($\text{DiffTime}_{MIN}$) of the difference values between the time of reading the previous exploration packet and the time of reading the current exploration packet while reading each of the exploration packets piled up in the socket buffer, and set the value obtained by multiplying the predetermined ratio $W_2$ ($W_2>1$) by the minimum value ($\text{DiffTime}_{MIN}$) as the second reference time ($T_2$).

In this manner, the second reference time ($T_2$) by the second method is set, and then the exploration packet reception unit 123 obtains the difference between the time of reading the previous exploration packet and the time of reading the current exploration packet in the socket buffer of the reception terminal 104. In this instance, when the difference between the time of reading the previous exploration packet and the time of reading the current exploration packet is the second reference time ($T_2$) by the second method or more, the exploration packet reception unit 123 determines that the current exploration packet is highly likely to have been immediately processed without the standing-by time in the socket buffer of the reception terminal 104, and therefore uses the current exploration packet as the sample of obtaining the OTT. On the other hand, when the difference between the time of reading the previous exploration packet and the time of reading the current exploration packet in the socket buffer of the reception terminal 104 is less than the second reference time ($T_2$) by the second method, the exploration packet reception unit 123 determines that the current exploration packet is highly likely to have been processed after standing by in the socket buffer of the reception terminal 104 for a predetermined time, and therefore does not use the current exploration packet as the sample of obtaining the OTT.

Meanwhile, the exploration packet reception unit 123 may set the maximum value of the second reference time by the first method and the second reference time by the second method as the second reference time ($T_2$).

Meanwhile, when all of the data packets are used as the exploration packets in the transmission terminal 102 or the interval between the exploration packets is significantly short, most of the exploration packets transmitted from the transmission terminal 102 stand by in the socket buffer of the reception terminal 104. In this case, when the exploration packet reception unit 123 obtains the OTT using the second reference time ($T_2$), the number of available exploration packets is significantly reduced. In this case, the exploration packet reception unit 123 does not perform an error prevention operation by the second error case, and performs only an error prevention operation by the first error case. That is, the exploration packet reception unit 123 may determine only whether the timestamp value of the exploration packet is valid without the error prevention operation by the second error case, and transmit the OTT of the exploration packet whose timestamp value is valid to the queuing delay calculation unit 127.

The data collection unit 125 extracts data included in the data packet and the exploration packet which are received from the data reception unit 121 and the exploration packet reception unit 123, and re-combines the extracted data using header information of the data packet and the exploration packet to follow the original order. In this case, the same data as original data of the transmission terminal 102 may be configured.

The queuing delay calculation unit 127 calculates queuing delay of the corresponding exploration packet using the OTT of each exploration packet transmitted from the exploration packet reception unit 123.

In this instance, the queuing delay calculation unit 127 may calculate the queuing delay of the exploration packet using Equations 2 and 3.

In order to prevent an error caused by the third error case (that is, error occurring when another operation is performed between the time of reading the exploration packet in the socket buffer of the reception terminal 104 and the time of measuring the current time), the queuing delay calculation unit 127 may perform the following operation. That is, the queuing delay calculation unit 127 may receive, from the exploration packet reception unit 123, the OTT value calculated by the timestamp value of the exploration packet in which the error caused by the first error case and the error caused by the second error case are excluded. However, when the other operation is performed between the time of reading the exploration packet in the socket buffer of the reception terminal 104 and the time of measuring the current time, the error caused by the third error case may be included in the OTT value received from the exploration packet reception unit 123.

Thus, in order to remove the error caused by the third error case, the queuing delay calculation unit 127 may obtain an average value (SOTT) of the OTTs using only a minimum value of the predetermined number of OTTs received from the exploration packet reception unit 123. This is based on analysis in which 1) the error of the OTT always causes overestimate and does not cause underestimate, and 2) the cause of the overestimate is intervention of other processes and therefore consecutive overestimate is hardly generated.

Specifically, the queuing delay calculation unit 127 does not use all of the OTT values transmitted from the exploration packet reception unit 123, and may calculate the average value (SOTT) of the OTTs using only the minimum value of the OTT values included in a window with a predetermined size (N).

FIGS. 6A and 6B illustrate a state in which the queuing delay calculation unit according to an embodiment of the present disclosure extracts a minimum value from OTTs using a window with a size of 3.

Referring to FIG. 6A, the queuing delay calculation unit 127 may sequentially receive, from the exploration packet reception unit 123, OTTs of an M-th exploration packet, an (M+1)-th exploration packet, an (M+2)-th exploration packet, an (M+3)-th exploration packet, and an (M+4)-th exploration packet. Here, the window with the size of 3 may be throughout three OTT values (that is, OTT values of (M+2)-th exploration packet, (M+3)-th exploration packet, and (M+4)-th exploration packet) recently received from the exploration packet reception unit 123.

When receiving the OTT of the (M+4)-th exploration packet from the exploration packet reception unit 123, the queuing delay calculation unit 127 does not directly use the OTT value of the (M+4)-th exploration packet when calculating the average value (SOTT) of the OTTs, but calculates the average value (SOTT) of the OTTs by substituting, for Equation 3, the OTT value (that is, 71 ms) of the (M+2)-th exploration packet having the minimum value of the three OTT values included in the window.

Referring to FIG. 6B, when receiving an OTT of an (M+5)-th exploration packet from the exploration packet reception unit 123, the window with the size of 3 is moved so as to include the three OTT values (that is, OTT values of (M+3)-th exploration packet, (M+4)-th exploration packet, and (M+5)-th exploration packet) which are recently received from the exploration packet reception unit 123. In this case, the queuing delay calculation unit 127 calculates the average value (SOTT) of the OTTs by substituting, for Equation 3, an OTT value (that is, 72 ms) of the (M+5)-th exploration packet having the minimum value of the three OTT values included in the window.

When using such a method, the OTT value including consecutive errors up to a maximum of N−1 errors is blocked in accordance with the size (N) of the window, thereby preventing the error caused by the third error case. However, in the tendency for an increase in the queuing delay, the average value (SOTT) of the OTTs is calculated in a state in which delay always occurs by N−1 exploration packets even though an error is not included in the OTT, and therefore the size of the window should not to be set too large and should be adjusted in accordance with the frequency of a case in which consecutive errors occur.

Meanwhile, when receiving, from the exploration packet reception unit 123, the OTT of the exploration packet whose timestamp value is valid without an error prevention operation by the second error case, the queuing delay calculation unit 127 may calculate the average value (SOTT) of the OTTs using the minimum value of the OTTs which have been collected for a predetermined time.

FIG. 7 illustrates a state in which exploration packets stand by in a socket buffer of a reception terminal according to an embodiment of the present disclosure.

Referring to FIG. 7, when the transmission terminal 102 uses all of data packets as exploration packets or an interval between the exploration packets is significantly short, most of the exploration packets transmitted from the transmission terminal 102 stand by in a socket buffer of the reception terminal 104. Here, a case in which an arrival time of each of the exploration packets is represented on the basis of t ms and each of the exploration packets arrives at an interval of 1 ms is illustrated. The inside of parentheses indicates a standing-by time of the corresponding exploration packet.

In this manner, when all of the exploration packets are reflected in the calculation of the queuing delay in a case in which the exploration packets are piled up in the socket buffer of the reception terminal 104 to stand by, errors with an average of 4 ms are introduced to cause overestimate of the queuing delay. Thus, the queuing delay calculation unit 127 may calculate the average value (SOTT) of the OTTs using the minimum value of the OTTs which have been collected for a predetermined time, thereby minimizing an error caused by the standing-by time in the socket buffer.

The backlog queue calculation unit 129 calculates a backlog queue using the queuing delay calculated by the queuing delay calculation unit 127. The backlog queue calculation unit 129 may calculate the backlog queue by multiplying a data reception rate for a predetermined period of time by the queuing delay. Here, the predetermined period of time may be set in units of the number of packets or in units of time.

The transfer rate calculation unit 131 calculates a transfer rate using the backlog queue calculated by the backlog queue calculation unit 129. The transfer rate calculation unit 131 may transmit the calculated transfer rate to the transmission terminal 102. Here, a case in which the transfer rate calculation unit 131 transmits the calculated transfer rate to the transmission terminal 102 has been described, but the present disclosure is not limited thereto. For example, the queuing delay and the data reception rate may be transmitted to the transmission terminal 102.

In addition, the data reception unit 121 and the exploration packet reception unit 123 have been described as separate configurations, but the present disclosure is not limited thereto. For example, the data reception unit 121 and the exploration packet reception unit 123 may be implemented as a single configuration.

Figure 8:
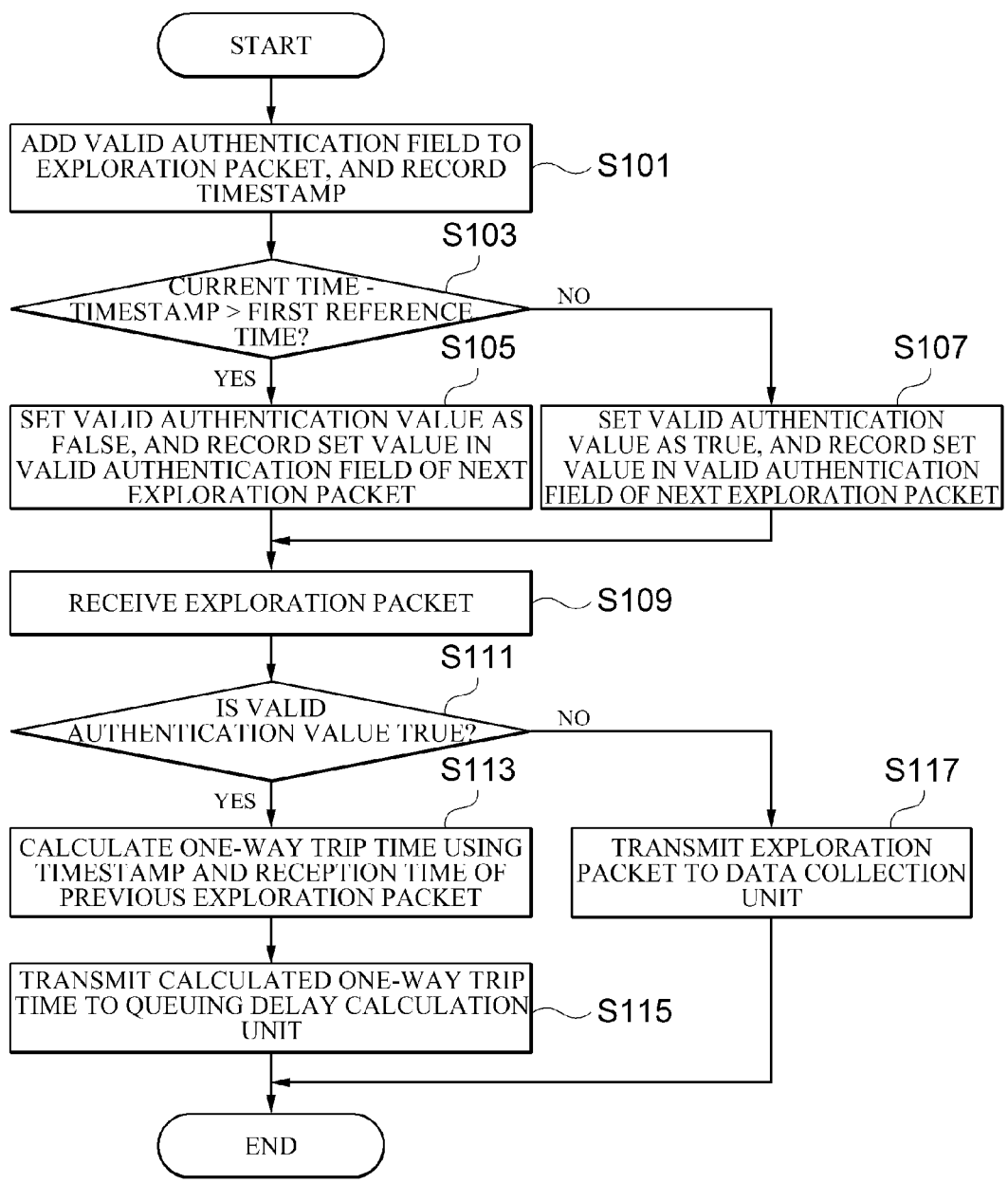
FIG. 8 is a flowchart illustrating a case of preventing an error caused by a first error case in a method of measuring a network state according to an embodiment of the present disclosure.

FIG. 8 is a flowchart illustrating a case of preventing an error caused by a first error case in a method of measuring a network state according to an embodiment of the present disclosure.

Referring to FIG. 8, in step S101, the exploration packet transmission unit 115 adds a validity authentication field to an exploration packet and records a timestamp. In this instance, the exploration packet may be a data packet transmitted from the data distribution unit 111, or may be separately generated by the exploration packet transmission unit 115.

Next, in step S103, the exploration packet transmission unit 115 obtains a difference between a current time and a timestamp value of the corresponding exploration packet, and verifies whether the difference between the current time and the timestamp value of the corresponding exploration packet exceeds a predetermined first reference time ($T_1$).

Next, in step S105, when the difference between the current time and the timestamp value of the corresponding exploration packet exceeds the predetermined first reference time ($T_1$) based on the verification result of step S103, the exploration packet transmission unit 115 sets a validity authentication value as false, and records the corresponding validity authentication value in a validity authentication field of the next exploration packet.

In addition, in step S107, when the difference between the current time and the timestamp value of the corresponding exploration packet does not exceed the predetermined first reference time ($T_1$) based on the verification result of step S103, the exploration packet transmission unit 115 sets the validity authentication value as true, and records the corresponding validity authentication value in the validity authentication field of the next exploration packet.

The exploration packet transmission unit 115 performs steps S101 to S107 with respect to each of the exploration packets, and then transmits each of the exploration packets to the reception terminal 104. Then, in step S109, the exploration packet reception unit 123 of the reception terminal 104 receives each of the exploration packets. In this instance, the exploration packet reception unit 123 obtains and stores a reception time of each of the exploration packets.

Next, in step S111, the exploration packet reception unit 123 verifies whether the validity authentication value of the currently received exploration packet is true.

In step S113, when the validity authentication value of the currently received exploration packet is true based on the verification result of step S111, the exploration packet reception unit 123 determines that a timestamp value of the previous exploration packet is valid, and calculates an OTT by subtracting the timestamp value of the previous exploration packet from a reception time of the previous exploration packet. In step S115, the exploration packet reception unit 123 transmits the calculated OTT to the queuing delay calculation unit 127.

In step S117, when the validity authentication value of the currently received exploration packet is not true (that is, in case of false) based on the verification result of step S111, the exploration packet reception unit 123 determines that the timestamp value of the previous exploration packet is not valid, and transmits the corresponding exploration packet to the data collection unit 125. In this instance, the corresponding exploration packet is not used as a sample of obtaining the OTT.

In this manner, the transmission terminal 102 adds the validity authentication value of the previous exploration packet to each of the exploration packets to transmit the exploration packet with the added validity authentication value, and the reception terminal 104 calculates the OTT using the timestamp value of the exploration packet whose validity authentication value is true, whereby it is possible to prevent occurrence of the error caused by the first error case (that is, error occurring when another operation is performed before the transmission terminal 102 transmits the exploration packet with the recorded timestamp after recording the timestamp in the exploration packet).

Figure 9:
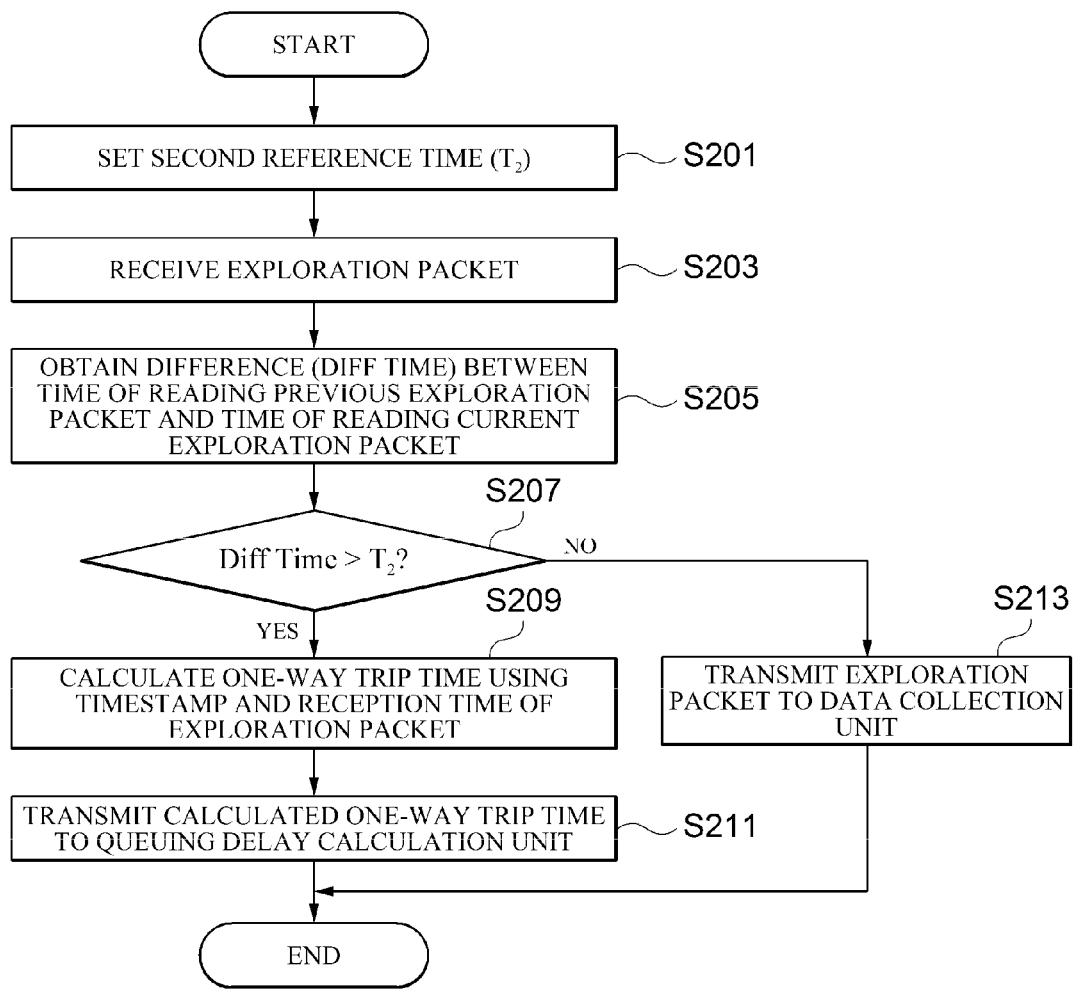
FIG. 9 is a flowchart illustrating a case of preventing an error caused by a second error case in a method of measuring a network state according to an embodiment of the present disclosure.

FIG. 9 is a flowchart illustrating a case of preventing an error caused by a second error case in a method of measuring a network state according to an embodiment of the present disclosure.

Referring to FIG. 9, in step S201, the exploration packet reception unit 123 sets a second reference time ($T_2$). In this instance, the exploration packet reception unit 123 may set the second reference time ($T_2$) (second reference time by a first method) by multiplying a transmission interval between exploration packets by a predetermined ratio $W_1$ ($W_1<1$).

In addition, the exploration packet reception unit 123 may obtain a minimum value ($DiffTime_{MIN}$) of differences each between a time of reading the previous exploration packet and a time of reading the current exploration packet while reading each of the exploration packets piled up in the socket buffer of the reception terminal 104, and set a value obtained by multiplying the minimum value ($DiffTime_{MIN}$) by a predetermined ratio $W_2$ ($W_2>1$) as the second reference time ($T_2$) (second reference time by a second method). In addition, the exploration packet reception unit 123 may set a maximum value of the second reference time by the first method and the second reference time by the second method, as the second reference time ($T_2$).

Next, in step 203, the exploration packet reception unit 123 receives exploration packets transmitted by the transmission terminal 102.

Next, in step S205, the exploration packet reception unit 123 obtains a difference (DiffTime) between a time of reading the previous exploration packet and a time of reading the current exploration packet in the socket buffer of the reception terminal 104.

Next, in step S207, the exploration packet reception unit 123 verifies whether the difference (DiffTime) between the time of reading the previous exploration packet and the time of reading the current exploration packet exceeds the predetermined second reference time ($T_2$).

In step S209, when the difference (DiffTime) between the time of reading the previous exploration packet and the time of reading the current exploration packet exceeds the predetermined second reference time ($T_2$) based on the verification result of step S207, the exploration packet reception unit 123 determines that there is no time for which the corresponding exploration packet stands by in the socket buffer, and calculates an OTT by subtracting a timestamp value of the corresponding exploration packet from a reception time of the corresponding exploration packet. In step S211, the exploration packet reception unit 123 transmits the calculated OTT to the queuing delay calculation unit 127.

In addition, in step S213, when the difference (DiffTime) between the time of reading the previous exploration packet and the time of reading the current exploration packet does not exceed the predetermined second reference time ($T_2$) based on the verification result of step S207, the exploration packet reception unit 123 determines that there is a time for which the corresponding exploration packet stands by in the socket buffer, and transmits the corresponding exploration packet to the data collection unit 125. In this instance, the corresponding exploration packet is not used as a sample of obtaining the OTT.

In this manner, the exploration packet reception unit 123 sets the second reference time ($T_2$) and calculates the OTT only when the difference (DiffTime) between the time of reading the previous exploration packet and the time of reading the current exploration packet exceeds the predetermined second reference time ($T_2$), whereby it is possible to prevent occurrence of the error caused by the second error case (error occurring due to the time for which the exploration packet stands by in the socket buffer of the reception terminal 104).

Figure 10:
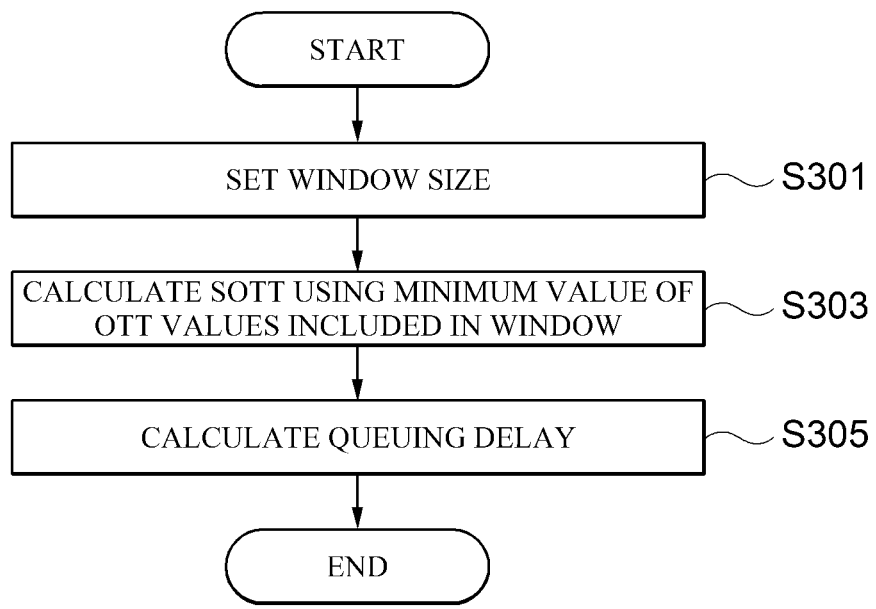
FIG. 10 is a flowchart illustrating a case of preventing an error caused by a third error case in a method of measuring a network state according to an embodiment of the present disclosure.

FIG. 10 is a flowchart illustrating a case of preventing an error caused by a third error case in a method of measuring a network state according to an embodiment of the present disclosure.

Referring to FIG. 10, in step S301, the queuing delay calculation unit 127 sets a size (N) of a window. In this instance, the queuing delay calculation unit 127 may set the size (N) of the window in accordance with the frequency of a case in which consecutive errors occur.

Next, in step S303, the queuing delay calculation unit 127 calculates an average value (SOTT) of OTTs using a minimum value of OTTs transmitted from the exploration packet reception unit 123. That is, when assuming that the queuing delay calculation unit 127 obtains a new average value ($SOTT_{NEW}$) of the OTTs using the following Equation 5, the queuing delay calculation unit 127 obtains the new average value ($SOTT_{NEW}$) of the OTTs by substituting, for $OTT_{NEW}$, the minimum value of the OTTs transmitted from the exploration packet reception unit 123.

$$SOTT_{NEW}=(1-\alpha)\cdot SOTT_{OLD}+\alpha\cdot OTT_{NEW}\ (0\leq\alpha\leq 1) \quad \text{[Equation 5]}$$

Next, in step S305, the queuing delay calculation unit 127 calculates queuing delay through a difference between the new average value ($SOTT_{NEW}$) of the OTTs and the minimum value (OTTmin) of the OTTs.

In this manner, the queuing delay calculation unit 127 calculates the average value (SOTT) of the OTTs using the minimum value of the OTTs transmitted from the exploration packet reception unit 123, whereby it is possible to prevent an error occurring when another operation is performed between a time of reading the exploration packet in the socket buffer of the reception terminal 104 and a time of measuring the current time.

FIG. 11 illustrates a flow over time of preventing errors caused by first to third error cases in a method of measuring a network state according to an embodiment of the present disclosure.

Referring to FIG. 11, the exploration packet transmission unit 115 records, in a validity authentication field of an M-th exploration packet, a validity authentication value indicating validity/invalidity of a timestamp value of an (M−1)-th exploration packet whenever transmitting the M-th exploration packet, and transmits the corresponding exploration packet to the exploration packet reception unit 123. Then, the exploration packet reception unit 123 determines validity/invalidity of the timestamp value of the (M−1)-th received exploration packet through the validity authentication value included in the currently received M-th exploration packet.

When receiving a first exploration packet, there is no previous exploration packet through which validity/invalidity of the timestamp value is verified, and therefore the exploration packet reception unit 123 stores a reception time ($CurTime_1$) of the first exploration packet and a timestamp value ($Timestamp_1$) thereof.

When receiving a second exploration packet, false is recorded in a validity authentication field of the second exploration packet, and therefore the exploration packet reception unit 123 determines that an error caused by the first error case is included in the first exploration packet, and discards the timestamp value ($Timestamp_1$) of the first exploration packet.

When receiving a third exploration packet, true is recorded in a validity authentication field of the third exploration packet, and therefore the exploration packet reception unit 123 determines that no error caused by the first error case is included in the second exploration packet. That is, the exploration packet reception unit 123 determines that a timestamp value ($Timestamp_2$) of the second exploration packet is valid. In addition, a difference between a reception time ($CurTime_2$) of the second exploration packet and the reception time ($CurTime_1$) of the first exploration packet exceeds a predetermined second reference time ($T_2$), and therefore the exploration packet reception unit 123 determines that no error caused by the second error case is included in the second exploration packet. In this instance, the exploration packet reception unit 123 obtains a first OTT ($OTT_1$) through a difference between the reception time ($CurTime_2$) of the second exploration packet and the timestamp ($Timestamp_2$) of the second exploration packet, and transmits the calculated first OTT ($OTT_1$) to the queuing delay calculation unit 127. Here, the first OTT ($OTT_1$) is a value of the first OTT, and therefore the queuing delay calculation unit 127 sets the first OTT ($OTT_1$) as a first OTT average value ($SOTT_1$).

When receiving a fourth exploration packet, true is recorded in a validity authentication field of the fourth exploration packet, and therefore the exploration packet reception unit 123 determines that no error caused by the first error case is included in the third exploration packet. That is, the exploration packet reception unit 123 determines that a timestamp ($Timestamp_3$) value of the third exploration packet is valid. However, a difference between a reception time ($CurTime_3$) of the third exploration packet and the reception time ($CurTime_2$) of the second exploration packet does not exceed the predetermined second reference time ($T_2$), and therefore the exploration packet reception unit 123 determines that the error caused by the second error case is included in the third exploration packet, and discards a timestamp ($Timestamp_3$) value of the third exploration packet.

When receiving a fifth exploration packet, true is recorded in a validity authentication field of the fifth exploration packet, and therefore the exploration packet reception unit 123 determined that no error caused by the first error case is included in the fourth exploration packet. That is, the exploration packet reception unit 123 determines that a timestamp (Timestamp$_4$) value of the fourth exploration packet is valid. In addition, a difference between a reception time (CurTime$_4$) of the fourth exploration packet and the reception time (CurTime$_3$) of the third exploration packet exceeds the predetermined reference time (T$_2$), and therefore the exploration packet reception unit 123 determines that no error caused by the second error case is included in the fourth exploration packet. In this instance, the exploration packet reception unit 123 calculates a second OTT (OTT$_2$) through a difference between the reception time (CurTime$_4$) of the fourth exploration packet and the timestamp (Timestamp$_4$) of the fourth exploration packet, and transmits the calculated second OTT (OTT$_2$) to the queuing delay calculation unit 127. In this case, there are two OTT samples such as the first OTT (OTT$_1$) and the second OTT (OTT$_2$) in the queuing delay calculation unit 127, and therefore the queuing delay calculation unit 127 obtains a second OTT average value (SOTT$_2$) using a minimum value of the first OTT (OTT$_1$) and the second OTT (OTT$_2$).

As described above, according to the embodiments of the present disclosure, exploration packets transmitted from the transmission terminal may be received to measure OTTs, and a network transfer rate may be calculated through the measured OTTs, whereby data may be transmitted at a transfer rate to fit a network state.

In addition, the transmission terminal may add the validity authentication value of the previous exploration packet in each exploration packet to transmit the exploration packet with the added validity authentication value, and the reception terminal may calculate the OTT using the timestamp of the exploration packet whose validity authentication value is true, whereby it is possible to prevent an error occurring when another operation is performed before the transmission terminal transmits the exploration packet with the recorded timestamp after recording the timestamp in the exploration packet.

In addition, the exploration packet reception unit may set the second reference time (T$_2$), and calculate the OTT only when the difference (DiffTime) between the time of reading the previous exploration packet in the socket buffer and the time of reading the current exploration packet exceeds the second reference time (T$_2$), whereby it is possible to prevent an error caused by the time for which the exploration packet stands by in the socket buffer of the reception terminal.

In addition, the queuing delay calculation unit may calculate the average value (SOTT) of the OTTs using the minimum value of the OTTs transmitted from the exploration packet reception unit, whereby it is possible to prevent an error occurring when another operation is performed between the time of reading the exploration packet in the socket buffer of the reception terminal and the time of measuring the current time.

It will be apparent to those skilled in the art that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. A system of measuring a network state comprising:
a transmission terminal that transmits exploration packets at a transmission rate based on a network state measurement variable; and
a reception terminal that receives the exploration packets to measure a One-way Trip Time (OTT) of each of the exploration packets, calculates a queuing delay using an average value of the measured OTTs and a minimum value of the measured OTTs, generates the network state measurement variable based on the calculated queuing delay, and transmits the network state measurement variable to the transmission terminal,
wherein the exploration packet includes a validity authentication field,
the transmission terminal compares a difference between a current time of the point of transmission of the exploration packet to a transmission socket and a timestamp value of the exploration packet with a predetermined first reference time (T$_1$) to thereby set a validity authentication value, and records the set validity authentication value in a validity authentication field of a next exploration packet, and
the reception terminal measures the OTT based on the validity authentication field.

2. The system of measuring the network state of claim 1, wherein the average value of the OTTs is calculated by the following Equation 1

$$SOTT_M = (1-\alpha) \cdot SOTT_{M-1} + \alpha \cdot OTT_M, \ (0 \leq \alpha \leq 1), \quad \text{[Equation 1]}$$

where SOTT$_M$ denotes an average value of OTTs up to an M-th exploration packet, SOTT$_{M-1}$ denotes an average value of OTTs up to an (M−1)-th exploration packet, OTT$_M$ denotes an one way trip time of an M-th exploration packet, and a denotes a weighted value indicating a ratio in which an OTT value of the M-th exploration packet is reflected in the average value of OTTs.

3. The system of measuring the network state of claim 1, wherein the transmission terminal sets the validity authentication value as false when the difference between the current time of the point of transmission of the exploration packet to the transmission socket and the timestamp value of the exploration packet exceeds the predetermined first reference time (T$_1$), and sets the validity authentication value as true when the difference between the current time of the point of transmission of the exploration packet to the transmission socket and the timestamp value of the exploration packet is the predetermined first reference time (T$_1$) or less.

4. The system of measuring the network state of claim 1, wherein the reception terminal determines whether a timestamp value of an exploration packet received prior to the exploration packet is valid in accordance with the validity authentication value recorded in the validity authentication field of the received exploration packet, and measures the OTT using the timestamp value determined to be valid.

5. The system of measuring the network state of claim 1, wherein the first reference time (T$_1$) is set based on at least one of a process scheduling time of the transmission terminal, an average time required for garbage collection, and an allowable maximum error time.

6. The system of measuring the network state of claim 1, wherein the reception terminal compares a difference between a reception time of a previous exploration packet and a reception time of a current exploration packet with a predetermined second reference time (T$_2$) to thereby determine whether to measure the OTT of the current exploration packet.

7. The system of measuring the network state of claim 6, wherein the reception terminal measures the OTT using the timestamp value of the current exploration packet when the difference between the reception time of the previous exploration packet and the reception time of the current exploration packet is the second reference time ($T_2$) or more, and discards the timestamp value of the current exploration packet when the difference between the reception time of the previous exploration packet and the reception time of the current exploration packet is less than the second reference time ($T_2$).

8. The system of measuring the network state of claim 6, wherein the second reference time ($T_2$) is set to be a predetermined ratio $W_1$ ($W_1<1$) based on a transmission interval of the previous exploration packet and the current exploration packet.

9. The system of measuring the network state of claim 6, wherein the second reference time ($T_2$) is set to be a predetermined ratio $W_2$ ($W_2>1$) based on a minimum value of the differences each between the reception time of the previous exploration packet and the reception time of the current exploration packet.

10. The system of measuring the network state of claim 1, wherein the reception terminal uses a minimum value of OTT values included in a window with a predetermined size in order to obtain the average value of the OTTs.

11. A terminal comprising:
a data transmission unit that transmits a data packet to an external terminal;
an exploration packet transmission unit that transmits an exploration packet in which a validity authentication field is added, to the external terminal; and
a transfer rate control unit that controls a data packet transfer rate of the data transmission unit in accordance with a network state measurement variable received from the external terminal,
wherein the exploration packet transmission unit compares a difference between a current time of the point of transmission of the exploration packet to a transmission socket and a timestamp value of the exploration packet with a predetermined reference time ($T_1$) to thereby set a validity authentication value, and records the set validity authentication value in a validity authentication field of a next exploration packet.

12. The terminal of claim 11, wherein the exploration packet transmission unit sets the validity authentication value as false when the difference between the current time of the point of transmission of the exploration packet to the transmission socket and the timestamp value of the exploration packet exceeds the predetermined reference time ($T_1$), and sets the validity authentication value as true when the difference between the current time of the point of transmission of the exploration packet to the transmission socket and the timestamp value of the exploration packet is the predetermined reference time ($T_1$) or less.

13. The terminal of claim 11, wherein the reference time ($T_1$) is set based on at least one of a process scheduling time of the terminal, an average time required for garbage collection, and an allowable maximum error time.

14. The terminal of claim 11, wherein the network state measurement variable is determined by the external terminal based on the exploration packet and indicates at least one among a queuing delay, a data reception rate, a backlog queue, and a transfer rate.

15. A terminal comprising:
an exploration packet reception unit that receives exploration packets, and measures a One-way Trip Time (OTT) using the received exploration packets;
a queuing delay calculation unit that obtains an average value of the OTTs transmitted from the exploration packet reception unit, and calculates a queuing delay using the average value of the OTTs and a minimum value of the OTTs transmitted from the exploration packet reception unit; and
a transfer rate calculation unit that determines a transfer rate based on the queuing delay and transmits the transfer rate to a transmission terminal,
wherein the exploration packet reception unit determines whether a timestamp value of an exploration packet received prior to the exploration packet is valid in accordance with a validity authentication value recorded in a validity authentication field of the received exploration packet, and measures the OTT using the timestamp value determined to be valid based on the validity authentication field.

16. The terminal of claim 15, wherein the queuing delay calculation unit calculates the average value of the OTTs by the following Equation 2

$$SOTT_M = (1-\alpha) \cdot SOTT_{M-1} + \alpha \cdot OTT_M, (0 \leq \alpha \leq 1),$$ [Equation 2]

where $SOTT_M$ denotes an average value of OTTs up to an M-th exploration packet, $SOTT_{M-1}$ denotes an average value of OTTs up to an (M−1)-th exploration packet, and a denotes a weighted value indicating a ratio in which an OTT value of the M-th exploration packet is reflected in the average value of OTTs.

17. The terminal of claim 15, wherein the exploration packet reception unit compares a difference between a reception time of a previous exploration packet and a reception time of a current exploration packet with a predetermined reference time ($T_2$) to thereby determine whether to measure the OTT of the current exploration packet.

18. The terminal of claim 17, wherein the exploration packet reception unit measures the OTT using the timestamp value of the current exploration packet when the difference between the reception time of the previous exploration packet and the reception time of the current exploration packet is the reference time ($T_2$) or more, and discards the timestamp value of the current exploration packet when the difference between the reception time of the previous exploration packet and the reception time of the current exploration packet is less than the reference time ($T_2$).

19. The terminal of claim 17, wherein the reference time ($T_2$) is set to be a predetermined ratio $W_1$ ($W_1<1$) based on a transmission interval of the previous exploration packet and the current exploration packet.

20. The terminal of claim 17, wherein the reference time ($T_2$) is set to be a predetermined ratio $W_2$ ($W_2>1$) based on a minimum value of the differences each between the reception time of the previous exploration packet and the reception time of the current exploration packet.

21. The terminal of claim 15, wherein the queuing delay calculation unit uses a minimum value of OTT values included in a window with a predetermined size in order to obtain the average value of the OTTs.

22. A terminal comprising:
an exploration packet reception unit that receives exploration packets, and measures a One-way Trip Time (OTT) using the received exploration packets;
a queuing delay calculation unit that calculates queuing delay using the OTT; and
a transfer rate calculation unit that determines a transfer rate based on the queuing delay and transmits the transfer rate to a transmission terminal,
wherein the exploration packet reception unit determines whether a timestamp value of an exploration packet received prior to the exploration packet is valid in accordance with a validity authentication value recorded in a validity authentication field of the received exploration packet, and measures the OTT using the timestamp value in response to determining the timestamp value is valid based on the validity authentication field.

23. A terminal comprising:
an exploration packet reception unit that receives exploration packets, and measures a One-way Trip Time (OTT) using the received exploration packets;
a queuing delay calculation unit that calculates a queuing delay using the OTT;
a transfer rate calculation unit that determines a transfer rate based on the queuing delay and transmits the transfer rate to a transmission terminal,
wherein the exploration packet reception unit generates a validity authentication field by comparing a difference between a reception time of a previous exploration packet and a reception time of a current exploration packet with a predetermined reference time ($T_2$) to thereby determine whether to measure an OTT of the current exploration packet,
wherein the exploration packet reception unit measures the OTT using the timestamp value of the current exploration packet when the difference between the reception time of the previous exploration packet and the reception time of the current exploration packet is the reference time ($T_2$) or more, and discards the timestamp value of the current exploration packet when the difference between the reception time of the previous exploration packet and the reception time of the current exploration packet is less than the reference time ($T_2$), and
the exploration packet reception unit measures the OTT based on the validity authentication field.

24. The terminal of claim 23, wherein the reference time ($T_2$) is set to be a predetermined ratio $W_1$ ($W_1 < 1$) based on a transmission interval of the previous exploration packet and the current exploration packet.

25. The terminal of claim 23, wherein the reference time ($T_2$) is set to be a predetermined ratio $W_2$ ($W_2 > 1$) based on a minimum value of the differences each between the reception time of the previous exploration packet and the reception time of the current exploration packet.

26. A method of measuring a network state, comprising:
transmitting, by a transmission terminal, exploration packets;
receiving, by a reception terminal, the exploration packets to measure a One-way Trip Time (OTT);
obtaining, by the reception terminal, an average value of the OTTs and calculating queuing delay using the average value of the OTTs and a minimum value of the OTTs;
determining, by the reception terminal, a transfer rate based on the queuing delay; and
transmitting, by the reception terminal, the transfer rate to the transmission terminal,
wherein the transmitting of the exploration packets includes:
 adding, by the transmission terminal, a validity authentication field to the exploration packet;
 comparing, by the transmission terminal, a difference between a current time of the point of transmission of the exploration packet to a transmission socket and a timestamp value of the exploration packet with a predetermined first reference time ($T_1$); and
 setting, by the transmission terminal, a validity authentication value in accordance with a result of the comparing, and recording the set validity authentication value in a validity authentication field of a next exploration packet, and
the OTT is measured by the reception terminal based on the validity authentication field.

27. The method of measuring the network state of claim 26, wherein the obtaining of the average value of the OTTs includes calculating the average value of the OTTs by the following Equation 3

$$SOTT_M = (1-\alpha) \cdot SOTT_{M-1} + \alpha \cdot OTT_M, (0 \leq \alpha \leq 1), \quad \text{[Equation 3]}$$

where $SOTT_M$ denotes an average value of OTTs up to an M-th exploration packet, $SOTT_{M-1}$ denotes an average value of OTTs up to an (M−1)-th exploration packet, and a denotes a weighted value indicating a ratio in which an OTT value of the M-th exploration packet is reflected in the average value of OTTs.

28. The method of measuring the network state of claim 26, wherein the receiving of the exploration packets to measure the OTT includes:
determining, by the reception terminal, whether a timestamp value of an exploration packet received prior to the exploration packet is valid in accordance with the validity authentication value recorded in the validity authentication field of the exploration packet; and
measuring, by the reception terminal, the OTT using the timestamp value determined to be valid.

29. The method of measuring the network state of claim 26, wherein the first reference time ($T_1$) is set based on at least one of a process scheduling time of the transmission terminal, an average time required for garbage collection, and an allowable maximum error time.

30. The method of measuring the network state of claim 26, wherein the receiving of the exploration packets to measure the OTT includes comparing, by the reception terminal, a difference between a reception time of a previous exploration packet and a reception time of a current exploration packet with a predetermined second reference time ($T_2$) to thereby determine whether to measure the OTT of the current exploration packet.

31. The method of measuring the network state of claim 30, wherein the comparing of the difference with the second reference time ($T_2$) to thereby determine whether to measure the OTT includes:
verifying, by the reception terminal, whether the difference between the reception time of the previous exploration packet and the reception time of the current exploration packet is the second reference time ($T_2$) or more; and
measuring, by the reception terminal, the OTT using the timestamp value of the current exploration packet when the difference between the reception time of the previous exploration packet and the reception time of the current exploration packet is the second reference time ($T_2$) or more.

32. The method of measuring the network state of claim 31, wherein the comparing of the difference with the second reference time ($T_2$) to thereby determine whether to measure the OTT includes discarding, by the reception terminal, the timestamp value of the current exploration packet when the difference between the reception time of the previous exploration packet and the reception time of the current exploration packet is less than the second reference time ($T_2$).

33. The method of measuring the network state of claim 30, wherein the second reference time ($T_2$) is set to be a predetermined ratio $W_1$ ($W_1$<1) based on a transmission interval of the previous exploration packet and the current exploration packet.

34. The method of measuring the network state of claim 30, wherein the second reference time ($T_2$) is set to be a predetermined ratio $W_2$ ($W_2$>1) based on a minimum value of the differences each between the reception time of the previous exploration packet and the reception time of the current exploration packet.

35. The method of measuring the network state of claim 34, wherein the comparing of the difference with the second reference time ($T_2$) to thereby determine whether to measure the OTT includes:
consecutively transmitting, by the transmission terminal, a plurality of exploration packets;
receiving, by the reception terminal, the plurality of exploration packets and obtaining each difference between the reception time of the previous exploration packet and the reception time of the current exploration packet; and
obtaining, by the reception terminal, a minimum value of the differences each between the reception time of the previous exploration packet and the reception time of the current exploration packet, and setting the second reference time ($T_2$) to be a predetermined ratio $W_2$ ($W_2$>1) based on the minimum value of the differences each between the reception time of the previous exploration packet and the reception time of the current exploration packet.

36. The method of measuring the network state of claim 26, wherein the obtaining of the average value of the OTTs includes:
extracting, by the reception terminal, a minimum value from OTTs included in a window with a predetermined size; and
using, by the reception terminal, the extracted minimum value of the OTTs in order to obtain the average value of the OTTs.

* * * * *